Aug. 8, 1961   W. FERRELL ET AL   2,994,940
PLASTIC COATED FABRIC AND METHOD OF MAKING SAME
Filed April 15, 1958   2 Sheets-Sheet 1

INVENTORS
WESLEY FERRELL
MARK W. OLSON
IRA D. DOBBS
BY James J. Long
AGENT

2,994,940
PLASTIC COATED FABRIC AND METHOD OF MAKING SAME

Wesley Ferrell, Fair Lawn, and Mark W. Olson and Ira D. Dobbs, Allendale, N.J., assignors to United States Rubber Company, New York, N.Y., a corporation of New Jersey
Filed Apr. 15, 1958, Ser. No. 729,049
7 Claims. (Cl. 28—74)

This invention relates to a plastic coated fabric and method of making same. More particularly it relates to a fabric coated with a plastic that does not completely penetrate the fabric, yet is applied in such a manner that the plastic firmly adheres to the fabric.

The invention has particular reference to coating fabric made of that type of synthetic fiber which is a condensation product of dimethyl terephthalate and ethylene glycol (the commercially available fiber known as Dacron, supplied by the Du Pont Co.). The invention is directed especially to the problem of coating such fabric with polyethylene.

Coated fabrics have been made and sold by industry for many years. In general, the fabric is used to supply additional strength or modulus to a cover material which in turn is selected for its chemical and physical properties or appearance in a multitude of applications.

Coated fabrics are made continuously by several methods. Normally a calender is employed for applying such materials as rubber or plasticized polyvinyl chloride on to a fabric. Often a fabric is chosen which can be chemically bonded to the cover material and a cementing operation is sometimes required or made use of. In some applications the fabric is embedded between two layers of the cover material and is mechanically locked therebetween. Often, the step of applying the cover material, such as with a doctor blade, is followed by a curing, setting or drying out operation.

The problem of coating a Dacron fabric with a non-porous layer of polyethylene cannot be solved by any of the known methods described above. This is particularly true when a pure (or uncompounded) polyethylene coating is a prerequisite of the finished product. The product can be made by a press laminating method but this is expensive, in contrast to the unique method herein described.

A special feature of the invention herein described is that it lends itself to coating a fabric with polyethylene without completely surrounding the fabric structure with the polyethylene coating. We have found that such a coated fabric construction is absolutely essential if the coated fabric is to be used to fabricate a fuel cell for 90% hydrogen peroxide, which is one of the uses for such fabrics. If the fabric structure is completely enclosed in polyethylene, any hydrogen peroxide which diffuses through the polyethylene and decomposes on reaching the fabric will cause the material to delaminate or blister profusely. We have found that when the fabric is only partially covered with the polyethylene, any free peroxide will not cause delamination.

The invention disclosed herein comprises a method of continuously applying a dense coating of polyethylene onto a Dacron fabric. This coating is applied without completely penetrating the fabric yet in such a manner that it adheres firmly thereto. The material is useful as a container material for handling corrosive chemicals and fuels and is very light in weight as compared to unreinforced sheets of polyethylene of equivalent strength.

The bond obtained between the polyethylene and Dacron fabric is strictly mechanical. A Brighton weave which presents a multitude of relatively free thread loops to the plastic is highly conducive to a good bond. Likewise, a spun Dacron thread, which presents innumerable free filament ends aids considerably in this regard. Actually, the polyethylene in a liquid state wets out the exposed thread loops and filament ends and shrinkage of both the polyethylene and Dacron on cooling locks the two firmly together.

While the specification concludes with claims particularly pointing out and distinctly claiming the subject matter regarded as the invention, it is believed that the invention will be better understood from the following description taken in connection with the accompanying drawings in which:

Figure 1:
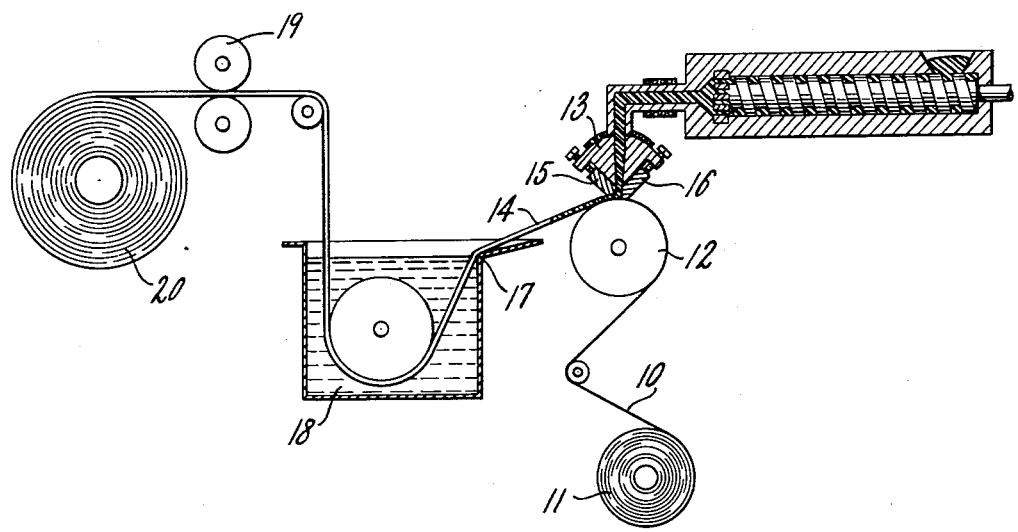
FIG. 1 is a diagrammatic view of one arrangement of apparatus for practicing this invention.

Referring to FIG. 1, fabric 10 to be coated is supplied under tension from a let-off roll 11 equipped with a brake (not shown) to maintain tension. The fabric passes onto a driven backing roll 12 mounted adjacent a heated sheeting head 13 of a heated extruder, which delivers plastic 14 to the surface of the fabric. The sheeting head includes transversely extending adjustable front and back dies 15 and 16, respectively, which can be adjusted at spaced points across the width of the fabric to vary locally the size of the extrusion orifice defined between them as well as the clearance between them and the fabric on the backing roll. The coated fabric passes over a straightening edge 17 of a cooling tank 18 and thence through driven pinch rolls 19 onto a friction driven wind-up roll 20.

In operation, polyethylene is melted and forced by the extruder through the set of dies directly onto the fabric as the latter is drawn past the dies over the backing roll. The set of conditions which make for best operation is listed below.

(1) The fabric is kept taut.

(2) The backing roll is driven. The speed of this roll and that of the pinch rolls is adjusted to synchronize with the delivery of polyethylene from the extruder.

(3) Polyethylene in the sheeting head is heated to 450° F. plus or minus 25° F. If too cold, the delivery of polyethylene at the ends of the sheeting head is restricted. If too hot (above 475° F.), the polyethylene does not bond to the fabric. The extent to which polyethylene wets the Dacron fabric is dependent on the pressure at which the former is applied. If too hot, the polyethylene is not sufficiently viscous to develop the pressure required and/or the Dacron filament ends melt and shrink away from the polyethylene.

(4) The front and back dies are adjusted to restrict, at their centers, the clearance between each other and between each individually and the backing roll. This compensates for higher pressures which exist at the center of the sheeting head and for the tendency of the head to distort when heated.

(5) The backing roll is cooled (internally) to prevent a build up of the polyethylene which completely penetrates the fabric at a slow yet unavoidable extent. It further insures that a continuous layer of polyethylene does not form on the back side of the fabric.

(6) The fabric must be closely woven to prevent excessive penetration of polyethylene and the possibility of a continuous layer forming on its back side. At the same time the fabric must present sufficient free filament ends and thread loops which can be locked by the polyethylene. A Brighton weave fabric made of spun Dacron yarn incorporates the features desired in a fabric for this operation.

(7) The fabric on approaching the backing roll is most preferably cool (or at room temperature) to prevent it from becoming excessively heated on contacting the polyethylene and to help chill the polyethylene so it does not completely penetrate the fabric.

(8) The water level is most preferably kept to within about a half inch of the cooling tank straightening edge. When above the straightening edge, water marks tend to appear in the polyethylene. When below ½ inch of the straightening edge, shrinkage of the laminate can cause it to corrugate.

In practice, Brighton weave Dacron fabric to a width of 32″ has been coated with polyethylene to an overall thickness of from .035″ to .075″ at a production speed of 150 ft. per hour.

Figure 2:
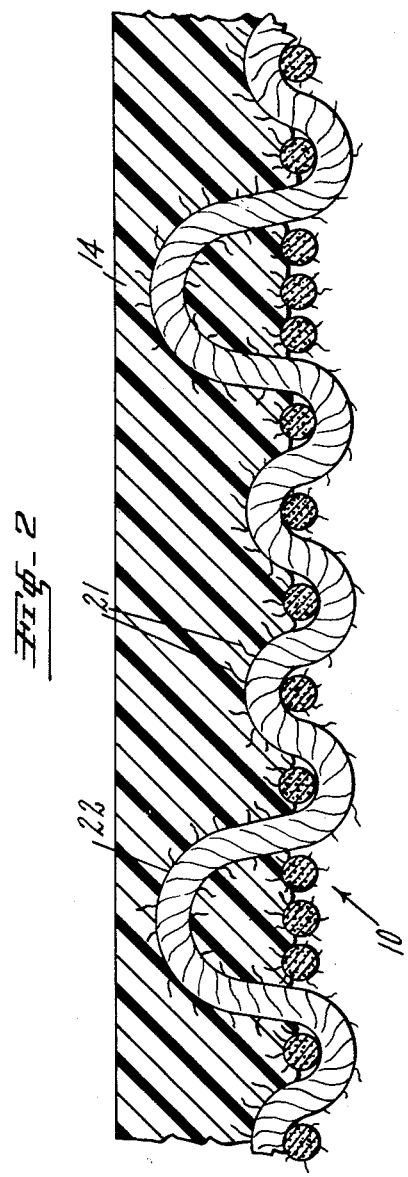
FIG. 2 is a sectional view of a coated fabric made in accordance with this invention.

Referring to FIG. 2, a coated fabric made in accordance with this invention has been illustrated. As indicated, the free filament ends 21 and thread loops 22 project from the surface of the fabric 10 into the plastic coating 14 to mechanically interlock the coating and fabric together.

It is desired to emphasize that the resulting coated fabric is particularly useful as a material for building fuel cells for 90% hydrogen peroxide.

While a particular embodiment of this invention has been shown and described, it will be obvious to those skilled in the art that various changes and modifications may be made without departing from this invention in its broader aspects and it is, therefore, aimed in the appended claims to cover all such changes and modifications as fall within the true spirit and scope of this invention.

Having thus described our invention, what we claim and desire to protect by Letters Patent is:

1. A coated fabric comprising a closely woven fabric, the fibers of which are made of synthetic fibrous dimethyl terephthalate-ethylene glycol condensation product, said fabric having protruding from a surface thereof numerous free filament ends and thread loops, and a dense, continuous polyethylene plastic covering on one side only of said fabric firmly mechanically interlocked with said filament ends and thread loops, said polyethylene covering penetrating only partially through the thickness of the fabric, and the fabric being exposed on the side opposite to said covering, said coated fabric being resistant to delamination upon exposure to 90% hydrogen peroxide.

2. A coated fabric as in claim 1 in which the said fabric is made of spun dimethyl terephthalate-ethylene glycol condensation product.

3. A coated fabric as in claim 2, in which the said fabric is a Brighton weave fabric.

4. A method of making a coated fabric comprising melting polyethylene plastic material, extruding it at a temperature of from 425° to 475° F. onto one side only of a continuously running length of closely woven fabric maintained under tension, the said fabric being made of dimethyl terephthalate-ethylene glycol condensation product and having numerous free filament ends and thread loops extending from its surface, the said ends and loops being wetted by the polyethylene, cooling the side of the fabric opposite to the aforesaid side onto which the molten polyethylene is being extruded, whereby the polyethylene penetrates the fabric only partially and said opposite side of the fabric remains exposed, and thereafter cooling the entire resulting assembly whereby both the polyethylene and the fabric shrink and the polyethylene becomes firmly mechanically interlocked with the fabric, the resulting coated fabric being resistant to delamination upon exposure to 90% hydrogen peroxide.

5. A method as in claim 4, in which the said fabric is made of spun dimethyl terephthalate-ethylene glycol condensation product.

6. A method as in claim 4, in which the said fabric is a Brighton weave fabric.

7. A method as in claim 4 in which the said cooling of the entire resulting assembly is accomplished by passing the assembly into a tank of cooling water subsequent to said extrusion.

References Cited in the file of this patent

UNITED STATES PATENTS

| | | |
|---|---|---|
| 2,364,435 | Foster et al. | Dec. 5, 1944 |
| 2,405,977 | Peters | Aug. 20, 1946 |
| 2,663,652 | Railing | Dec. 22, 1953 |
| 2,678,285 | Browning | May 11, 1954 |
| 2,679,969 | Richter | June 1, 1954 |
| 2,716,074 | Mick et al. | Aug. 23, 1955 |
| 2,745,141 | Brennan | May 15, 1956 |
| 2,801,446 | Wolinski | Aug. 6, 1957 |